Aug. 30, 1932.     F. PORTER     1,874,801
PROCESS FOR THE DECOMPOSITION OF HYDROCARBONS
Filed June 24, 1930
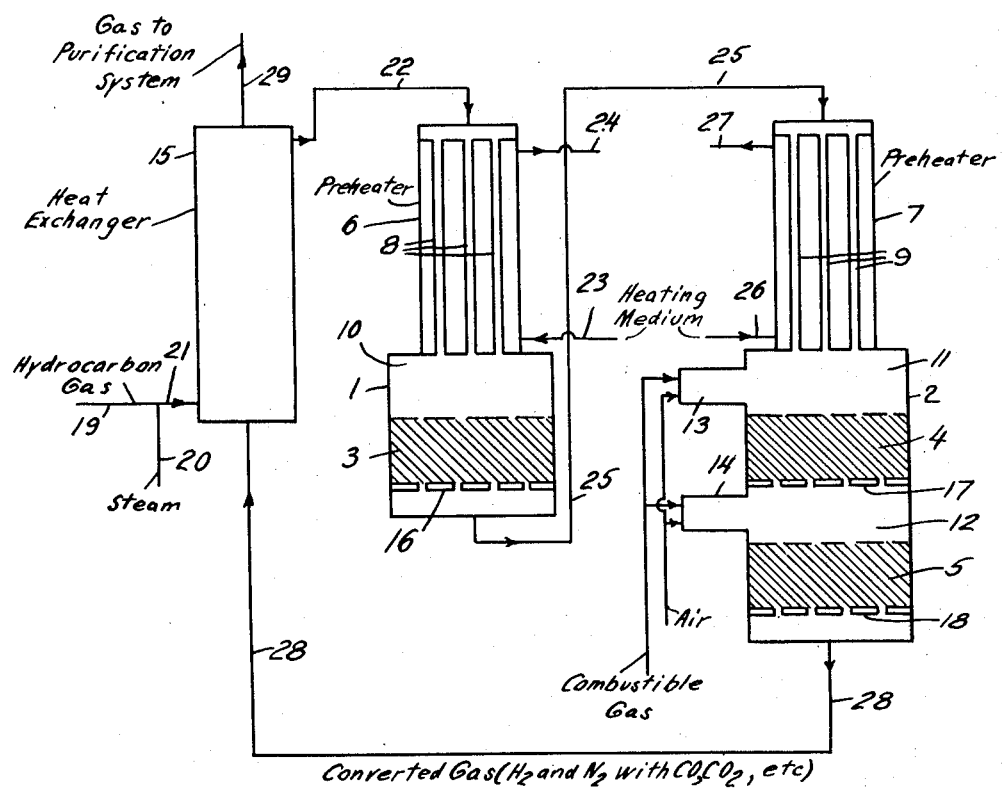
INVENTOR
FRANK PORTER
BY
ATTORNEY Patented Aug. 30, 1932

1,874,801

UNITED STATES PATENT OFFICE

FRANK PORTER, OF SYRACUSE, NEW YORK, ASSIGNOR TO ATMOSPHERIC NITROGEN CORPORATION, OF NEW YORK, N. Y., A CORPORATION OF NEW YORK

PROCESS FOR THE DECOMPOSITION OF HYDROCARBONS

Application filed June 24, 1930. Serial No. 463,463.

This invention relates to a process for the dehydrogenation of carbon compounds. More particularly, this invention relates to the production of hydrogen by the reaction of a hydrocarbon and water vapor in the presence of a catalyst.

It has heretofore been proposed to react a hydrocarbon and water vapor in the presence of a catalyst to produce hydrogen, carbon dioxide and carbon monoxide. For example, U. S. P. 1,128,814 discloses the treatment of a hydrocarbon, such as methane or gases containing methane with a nickel catalyst. In carrying out the process described in this patent, the reaction between methane, for example, and water vapor, takes place mainly in accordance with the following equation:

$$CH_4 + H_2O = CO + 3H_2$$

The hydrogen thus produced is accompanied by a relatively large amount of carbon monoxide. The carbon monoxide may in large part react with steam in accordance with the equation:

$$CO + H_2O = CO_2 + H_2$$

and after removal of the residual unreacted carbon monoxide, a hydrogen gas suitable for use in commercial operations, such as ammonia synthesis, is obtained. The process as described, however, requires two separate catalytic treatments of the hydrocarbon employing different catalysts for each step.

It has also been proposed to produce hydrogen from a hydrocarbon, such as methane, and water vapor, in the presence of a catalyst by a process in which reaction between the hydrocarbon and water vapor, forms hydrogen and carbon dioxide in accordance with the equation:

$$CH_4 + 2H_2O = CO_2 + 4H_2$$

together with a minor amount of carbon monoxide.

The reaction between methane, for example and water vapor (steam) to produce hydrogen and either carbon monoxide or carbon dioxide is endothermic, and in treating a gas containing a large proportion of hydrocarbon such as natural gas, large quantities of heat must be supplied to the reacting gases in order to maintain them at a proper reaction temperature while in contact with the catalyst employed for catalyzing the reaction. It has heretofore been proposed to supply this heat to the catalyst and gases in contact therewith by heating the vessel containing the catalyst. Such a process has the disadvantages attendant upon the transfer of large quantities of heat through relatively restricted surfaces. Because of the large temperature difference between the heating medium and the gases and catalyst to be heated required for the transfer of the necessary amount of heat, portions of the catalyst become overheated, and particularly in the case of catalysts which are active at low temperatures, such local overheating rapidly destroys the high catalytic activity of the material.

Furthermore, a vessel of a size and shape suitable for containing a charge of catalyst for catalyzing the reaction of a hydrocarbon and steam on a commercial scale is not suitable for the transfer of heat to the catalyst and gases in contact therewith. When operating at relatively high temperatures, such as 800–1000° C., it has been proposed to provide heat for the reaction by introducing with the hydrocarbon gas a quantity of free oxygen which, by burning a part of the combustible hydrocarbon gas, liberates heat and thus serves to maintain proper reaction temperatures. Such a process, however, was not suitable when the catalysts active at lower temperatures were employed, for it has heretofore been considered that free oxygen in the gases admitted to such catalysts rapidly destroys their catalytic activity at the relatively low temperatures, for example below 700° C.

It is an object of this invention to provide a process for the production of hydrogen by reaction between a hydrocarbon and steam in the presence of a catalyst wherein the catalyst may be maintained in a simple manner at predetermined temperatures and the decomposition of the hydrocarbon carried out in an efficient, economical manner. Other objects of the invention will in part be obvious and will in part appear hereinafter.

I have discovered that the decomposition of a hydrocarbon and water vapor, employing a catalyst for the reaction may be efficiently carried out by dividing the catalyst material into a plurality of separate bodies and independently controlling the temperature of the gases passed in contact with each of said bodies whereby a predetermined desired temperature of operation of each body of catalyst may be maintained and the efficiency of the catalyst conserved. Further, I have discovered that a gas containing nitrogen and hydrogen in the ratio by volume of one part of nitrogen to every three parts of hydrogen may be prepared by burning a combustible gas with air and introducing the hot products of combustion into a gas mixture of a hydrocarbon and water vapor which is subsequently passed in contact with a catalyst, preferably a catalyst such as is described in my copending U. S. patent application, Serial No. 463,462 filed June 24, 1930, at temperatures below about 750° C., the amounts of the hydrocarbon gas and the products of combustion being such that after the reaction of the hydrocarbon and steam, the gaseous product contains nitrogen and hydrogen in the desired ratio.

In carrying out this invention, a hydrocarbon gas such as natural gas, which consists principally of methane; a gas obtained by the distillation of bituminous coal to form coke; coal gas or water gas made from bituminous coal and water vapor, such gases preferably being substantially free from sulfur, are brought into contact with a catalytic agent and heat required for maintaining the desired reaction temperatures is supplied as sensible heat in the gases passed into contact with the catalyst. The invention comprises dividing the catalyst into a plurality of separate beds and passing the hydrocarbon gas in series through the beds of catalyst. The invention further comprises the several steps and the relation of one or more of such steps with respect to each of the others which are exemplified in the following detailed disclosure and the scope of the invention will be indicated in the claims.

For a fuller understanding of the nature and objects of the invention, reference should be had to the following detailed description taken in connection with the accompanying drawing in which is diagrammatically illustrated a process for the production of hydrogen by the decomposition of a hydrocarbon and water vapor in the presence of a catalyst.

In the drawing, numerals 1 and 2 designate converters arranged with perforated plates 16, 17 and 18 for supporting a plurality of beds of catalyst material 3, 4 and 5. Converters 1 and 2 are operatively connected with preheaters 6 and 7 respectively which are preferably constructed of chrome-iron or chrome-nickel-iron alloys. Preheaters 6 and 7 comprise nests of tubes 8 and 9 communicating respectively with gas chambers 10 and 11 of converters 1 and 2. Converter 2 contains two catalyst beds 4 and 5 separated by a gas chamber 12. Two gas burners 13 and 14 communicate respectively with gas chambers 11 and 12 of converter 2. A heat exchange 15 is arranged for passing a gas drawn from converted 2 in indirect heat exchange relation with a gas on its way to preheater 6.

In treating a hydrocarbon gas in accordance with this invention in the apparatus described and illustrated in the drawing, a quantity of catalyst, preferably a catalyst such as is described in my above identified copending application, is divided into a plurality of separate portions and these portions are placed in converters 1 and 2 to form separate bodies of catalyst 3, 4 and 5. A hydrocarbon gas, for example natural gas, from a pipe 19 and steam from a pipe 20, preferably in the proportions of about 15 volumes of steam to every 1 volume of natural gas, are passed through pipe 21, heat exchanger 15 and a pipe 22 into the top of preheater 6 and hence through tubes 8 of this preheater. The natural gas should be substantially free from sulfur compounds. In preheater 6 the mixture of natural gas and steam is heated to a temperature within the range of efficient operation of the catalyst, for example in employing the catalyst of Example I of the above copending application to a temperature of about 600° C., by indirect heat exchange with a heating medium passed about tubes 8. This heating medium, which may be the hot gases obtained by the combustion of a gaseous fuel such as natural gas or producer gas, or of a carbonaceous fuel such as coke or coal, is admitted to the preheater from a pipe 23 and leaves the preheater through a pipe 24. The gases thus heated pass into gas chamber 10 of the catalyst vessel 1 and thence through the body of catalyst material 3 whereby a portion of the hydrocarbon and the steam in the gas is caused to react to produce hydrogen and carbon dioxide, together with a relatively small proportion of carbon monoxide. Due to the endothermic character of the reaction between the steam and the hydrocarbon, the temperature of the gases passing through the catalyst body becomes lower. Before the temperature has decreased below an efficient operating range of temperatures for the catalyst, for example when the temperature of the gases has decreased to about 500° C. the reacting gases reach the bottom of the bed of catalyst and are withdrawn from contact with the catalyst body and passed through a pipe 25 to preheater 7.

In preheater 7 the gas from pipe 25 passes through tubes 9 and is heated by a heating medium which enters the preheater from a pipe 26, passes about tubes 9 and leaves through a pipe 27. This heating medium may be of the same kind as that employed in preheater 6. The gases passing through tubes 9 are thus heated and pass into gas chamber 11 of catalyst vessel 2. Air and a combustible gas which may be of the same composition as the hydrocarbon gas entering pipe 19 for catalytic treatment with steam, or any other suitable gas such as a gas containing hydrogen and/or carbon monoxide, bleeder gas from an ammonia synthesis plant, etc., are introduced into a burner 13 which communicates with gas chamber 11. In burner 13 the gas is burned with the air admitted thereto and the hot products of combustion are passed into chamber 11 and into the gas therein.

The sensible heat added to the hydrocarbon gas in preheater 7 supplementing the heat of combustion of the gases from burner 13, preheats the gas to a temperature within the range of efficient operation of the catalyst, as for example to a temperature of about 600° C., and the thus preheated gas is passed into and through the bed of catalyst 4. Before the temperature of the gas in contact with the catalyst bed 4 has been lowered by the heat absorbed in the endothermic reaction of the hydrocarbon and steam to a temperature below the range of efficient operating temperatures of the catalyst, the gas reaches the bottom of the catalyst bed 4 and is withdrawn therefrom to gas chamber 12. In gas chamber 12 the gas is mixed with the hot combustion products of a combustible gas burned with air in burner 14, and the mixture of gases is passed through catalyst bed 5 where the decomposition of the hydrocarbon and steam is completed.

The introduction into the hydrocarbon-steam gas in gas chambers 11 and 12 of the hot products of combustion of a combustible gas with air, serves not only to supply heat for the catalytic reaction but to mix therewith a proportion of nitrogen. In employing the process described for the production of a gas for ammonia synthesis, it is preferable to employ in burners 13 and 14 an amount of air such that the gaseous product resulting from the decomposition of the hydrocarbon gas and steam in catalyst bed 5, contains nitrogen and hydrogen in the ratio by volume of about three parts of hydrogen to one part of nitrogen. The gas thus obtained, after removal of carbon dioxide, carbon monoxide and other impurities, may be directly introduced into an ammonia synthesis system.

The relative amounts of the separate portions of hot products of combustion of combustible gas and air produced in each of the two burners 13 and 14 respectively, and introduced into the gas in a corresponding plurality of stages of catalysis, are so proportioned that by introducing the combustion products into the hydrocarbon-steam gas prior to its passing through catalyst bodies 4 and 5, a desired predetermined relationship between the temperatures of the gas in contact with bodies 4 and 5 is maintained. At the same time the desired predetermined elevated temperature of the gases in contact with the catalyst bodies 4 and 5 is maintained by the addition of sensible heat to the hydrocarbon-steam gas in its passage through preheater 7.

It may be desirable to so proportion the amounts of air and combustion gas passed to burners 13 and 14 that all of the free oxygen in the air is consumed before the products of combustion are mixed with the hydrocarbon-steam gas and passed into contact with catalyst bodies 4 and 5.

The converted gas now containing hydrogen and nitrogen, together with carbon dioxide and a minor proportion of carbon monoxide and other compounds, is withdrawn from catalyst vessel 2 through a pipe 28 and passed through heat exchanger 15 in indirect heat exchange relation with the hydrocarbon-steam mixture on its way to preheater 6. By thus transferring sensible heat contained in the converted gas to fresh quantities of the hydrocarbon-steam mixture on its way to catalyst, the heat contained in the converted gas is conserved and the necessary amount of heating of the hydrocarbon-steam mixture in preheater 6, prior to its passing in contact with catalyst bed 3, is decreased. The converted gas is withdrawn from heat exchanger 15 by way of a pipe 29 and is passed to a purification system wherein it is treated in well known manner for the removal of its carbon monoxide and carbon dioxide content and other impurities. The thus purified gas is suitable for the synthesis of ammonia.

The process for the production of hydrogen from a hydrocarbon and water vapor as described above, comprises preheating a gas comprising a hydrocarbon and water vapor to a temperature within the range of efficient operation of a catalyst adapted to catalyze the reaction between the hydrocarbon and water vapor to produce hydrogen, and preferably to a temperature within the range of about 400° C. to 750° C. The catalyst is divided into a plurality of separate bodies and the gas contacted with the catalyst bodies in successive stages. The gas is withdrawn from contact with the body of catalyst in one or more of the stages before the temperature of the gas has decreased to below the range of efficient operation of the catalyst, preferably before the temperature has decreased to below about 400° C., and is heated preferably to about 400° C. to 750° C., by the addition thereto of sensible heat. All of the thus withdrawn and heated gas is passed into contact with a body of catalyst in a succeeding stage.

While the particular example of the invention described above includes adding the combustion products of combustible gas and air to the hydrocarbon-steam gas prior to its passing into each of the catalyst beds in converter 2, this invention may be modified if desired by supplying all of the heat required for maintaining the temperature of the catalyst by indirect heat exchange between the hydrocarbon-steam gas and the heating medium. In carrying out the invention in accordance with this modification, it is preferable to provide a heat exchanger for each bed of catalyst whereby the gas, prior to passage through each bed of catalyst, is brought to the desired temperature by passing through a heat exchanger associated with the vessel containing the bed of catalyst.

In practicing this invention, it is not necessary that the catalyst be divided into three separate beds, but, if desired, a greater number of separate beds may be employed. By increasing the number of catalyst beds, the maximum temperature to which the gas must be heated, prior to its passage through each of the beds in order that the temperature may not fall below an efficient operating range, may be lowered to such an extent that steel tubes may be a satisfactory material for the construction of the heating surfaces of the preheaters.

By employing the process of this invention, a more efficient heating of the catalyst and gases contacted therewith is attained than by a process which involves the transfer of heat through the walls of the catalyst vessel. A high velocity of the hydrocarbon-steam gas during its passage through the preheaters may be maintained whereby the transfer of heat is improved without at the same time requiring an excessively high drop in pressure in order to force the gas through the apparatus at the desired rate, such as would be the case if the gas were heated while in contact with the catalyst in an externally heated converter. Another advantage resides in the fact that the catalyst may be more readily charged or removed from the converter where it is arranged in beds than is the case where the catalyst is distributed in externally heated tubes. Finally, in those processes where the gas is heated while in contact with the catalyst, proper control of the temperature is exceedingly difficult because of a packing of powdered catalyst in portions of the apparatus which results in the flow of gas through those portions being diminished and an overheating and failure of the metal surfaces. This difficulty is overcome by the process of this invention which provides for bringing the hydrocarbon-steam gas to the desired temperature prior to its passing into contact with the catalyst.

Since certain changes in carrying out the above process for the production of hydrogen which embody the invention may be made without departing from its scope, it is intended that all matter contained in the above description or shown in the accompanying drawing shall be interpreted as illustrative and not in a limiting sense.

1. The process of producing hydrogen which comprises contacting at an elevated temperature a gas containing a hydrocarbon and water vapor with a body catalyst adapted to catalyze the reaction between said hydrocarbon and water vapor to produce hydrogen, withdrawing the reaction products from contact with said body of catalyst, adding sensible heat to said withdrawn products, and passing all of said products into contact with a separate body of catalyst adapted to catalyze said reaction.

2. In a process for the production of hydrogen by reaction at an elevated temperature of a hydrocarbon and water vapor in contact with a catalyst, that improvement which comprises maintaining predetermined reaction temperatures of the catalyst and a gas undergoing reaction in contact therewith by dividing said catalyst into a plurality of separate bodies, contacting said hydrocarbon and water vapor with said bodies in successive stages, and intermediate two of said stages, adding sensible heat to the reaction products from the catalyst employed in the first of said stages, and passing all of said reaction products into contact with the catalyst employed in the second of said stages.

3. The process of producing hydrogen which comprises preheating a gas containing a hydrocarbon and water vapor to a temperature within the range of about 400° C. to 750° C., passing said preheated gas in contact with a body of catalyst adapted for the catalysis of the reaction of said hydrocarbon and steam to form hydrogen at said temperature, withdrawing the gas undergoing reaction from contact with said catalyst body before the temperature of the gas has decreased to below about 400° C., heating all of said withdrawn gas to a temperature within the range of about 400° C. to 750° C., by addition of sensible heat thereto, and passing the thus heated gas into contact with a second body of the aforesaid catalyst.

4. The process of producing hydrogen which comprises contacting a gas containing a hydrocarbon and water vapor with a body of catalyst adapted for catalyzing the reaction of said hydrocarbon and water vapor to form hydrogen at a temperature below about 750° C., preheating the gas prior to said contact to a temperature within the range of efficient operation of said catalyst, withdrawing the reacting gas from contact with said body before the temperature has decreased below said range, heating the withdrawn gas to a temperature within said range, by addition of sensible heat thereto, and passing all said withdrawn gas into contact with a second body of said catalyst.

5. The process for the production of a 1:3 nitrogen-hydrogen gas for ammonia synthesis which comprises passing a gas containing a hydrocarbon and steam at a temperature below about 750° C. in contact with a catalyst adapted to catalyze the reaction between said hydrocarbon and steam to produce hydrogen, burning a combustible gas with air, and introducing the hot products of combustion into the said gas containing a hydrocarbon and water vapor in amount such that the gaseous products obtained by the aforesaid catalysis of said gas contains nitrogen and hydrogen in the ratio of about 1:3.

6. In the process for the production of hydrogen for ammonia synthesis which comprises passing a gas containing a hydrocarbon and water vapor in contact with a catalyst adapted to catalyze the reaction between said hydrocarbon and steam to produce hydrogen, that improvement which comprises maintaining predetermined reaction temperatures by dividing said catalyst into a plurality of separate bodies, contacting said gas containing a hydrocarbon and water vapor with said bodies in successive stages, burning a combustible gas with air, introducing a plurality of separate portions of the hot products of combustion into said gas containing a hydrocarbon and water vapor in a corresponding plurality of said stages, maintaining a predetermined relationship between the temperatures of said gas in said last mentioned plurality of stages by proportioning the amount of said hot products of combustion introduced in the several stages, introducing in all of said stages an amount of said hot products of combustion such that the gaseous product contained by the aforesaid catalysis of said gas contains nitrogen and hydrogen in the ratio of about 1:3, and maintaining a predetermined elevated temperature of the gases undergoing catalysis in the aforesaid stages by passing said gas containing a hydrocarbon and steam in indirect heat transfer relation with a heating medium.

7. In a process for the production of hydrogen by reaction at an elevated temperature of natural gas and water vapor in contact with a catalyst, that improvement which comprises maintaining predetermined reaction temperatures of the catalyst and gas undergoing reaction in contact therewith by dividing said catalyst into a plurality of separate bodies, contacting said natural gas and water vapor with said bodies in successive stages, and intermediate two of said stages, adding sensible heat to the reaction products from the catalyst employed in the first of said stages, and passing all of said reaction products into contact with the catalyst employed in the second of said stages.

8. The process of producing hydrogen which comprises contacting natural gas and water vapor with a body of catalyst adapted for catalyzing the reaction of said natural gas and water vapor to form hydrogen at a temperature below about 750° C., preheating the gas prior to said contact to a temperature within the range of efficient operation of said catalyst, withdrawing the reacting gas from contact with said body before the temperature has decreased below said range, heating the withdrawn gas to a temperature within said range by the addition of sensible heat thereto and passing all said withdrawn gas into contact with a second body of said catalyst.

9. The process of producing hydrogen which comprises preheating a gas containing a hydrocarbon and water vapor to a temperature within the range of about 400° C. to 750° C., passing said preheated gas in contact with catalyst material adapted for the catalysis of the reaction of said hydrocarbon and steam to form hydrogen at said temperature, withdrawing gas undergoing reaction from contact with said catalyst body before the temperature of the gas has decreased to below about 400° C., heating said withdrawn gas by addition of sensible heat thereto, again passing the thus heated gas into contact with catalyst material adapted for the catalysis of said reaction of the hydrocarbon and steam, and during the aforesaid steps adding sufficient sensible heat to the said withdrawn gas to maintain said gas at temperatures within the range of about 400° C. to 750° C. while it is again passing in contact with catalytic material.

In witness whereof I hereunto affix my signature.

FRANK PORTER.

CERTIFICATE OF CORRECTION.

Patent No. 1,874,801.                                      August 30, 1932.

FRANK PORTER.

It is hereby certified that error appears in the printed specification of the above numbered patent requiring correction as follows: Page 2, line 74, for "converted" read converter; page 3, line 94, for "catalyst" read catalysis; page 4, line 74, claim 1, before the word "catalyst" insert the word of; page 5, line 44, claim 6, for "contained" read obtained; and that the said Letters Patent should be read with these corrections therein that the same may conform to the record of the case in the Patent Office.

Signed and sealed this 29th day of November A. D. 1932.

(Seal)                                                        M. J. Moore,
Acting Commissioner of Patents.